US010375702B2

(12) United States Patent
Wang (10) Patent No.: US 10,375,702 B2
(45) Date of Patent: Aug. 6, 2019

(54) METHOD AND APPARATUS FOR GUIDED ADAPTIVE SPATIAL REUSE IN WIRELESS COMMUNICATION

(71) Applicant: MEDIATEK INC., Hsinchu (TW)

(72) Inventor: James June-Ming Wang, San Marino, CA (US)

(73) Assignee: MEDIATEK INC., Hsinchu (TW)

( * ) Notice: Subject to any disclaimer, the term of this patent is extended or adjusted under 35 U.S.C. 154(b) by 0 days.

(21) Appl. No.: 15/269,614

(22) Filed: Sep. 19, 2016

(65) Prior Publication Data

US 2017/0086206 A1    Mar. 23, 2017

Related U.S. Application Data

(60) Provisional application No. 62/220,367, filed on Sep. 18, 2015.

(51) Int. Cl.
*H04W 72/08* (2009.01)
*H04W 52/36* (2009.01)
*H04W 52/24* (2009.01)

(52) U.S. Cl.
CPC ....... *H04W 72/085* (2013.01); *H04W 52/367* (2013.01); *H04W 52/243* (2013.01)

(58) Field of Classification Search
CPC . H04W 88/08; H04W 52/243; H04W 52/367; H04W 72/085; H04W 84/12; H04W 72/042; H04W 52/50; H04W 52/146; H04W 52/242; H04W 52/245; H04W 52/16; H04W 24/02; H04W 16/14
See application file for complete search history.

(56) References Cited

U.S. PATENT DOCUMENTS

| 2011/0014910 | A1* | 1/2011 | Yonge, III | ........ H04W 74/0808 455/434 |
| 2016/0174079 | A1 | 6/2016 | Wang et al. | |
| 2017/0187848 | A1* | 6/2017 | Itagaki | .................. H04L 69/323 |
| 2017/0202016 | A1* | 7/2017 | Itagaki | .................. H04W 74/08 |

FOREIGN PATENT DOCUMENTS

JP    WO 2016/006312 A1    1/2016

OTHER PUBLICATIONS

Combined Office Action and Search Report dated Mar. 30, 2018 in Taiwanese Patent Application No. 106125814 (with English translation of categories of cited documents), 7 pages.

* cited by examiner

*Primary Examiner* — Ricardo H Castaneyra
(74) *Attorney, Agent, or Firm* — Oblon, McClelland, Maier & Neustadt, L.L.P.

(57) ABSTRACT

Aspects of the disclosure provide an apparatus for wireless communication. The apparatus includes a transceiver and a processing circuit. The transceiver is configured to transmit and receive wireless signals. The processing circuit is configured to receive guiding information for spatial re-use that is carried by a wireless signal transmitted from another apparatus in a same service set with the apparatus, determine wireless information surrounding the apparatus based on the received wireless signals, determine spatial re-use parameters following the guiding information and based on the wireless information surrounding the apparatus, and control the transceiver based on the determined spatial re-use parameters to control transmission concurrently with ongoing wireless communication in one or more other service sets that overlap with the service set.

16 Claims, 5 Drawing Sheets

METHOD AND APPARATUS FOR GUIDED ADAPTIVE SPATIAL REUSE IN WIRELESS COMMUNICATION

INCORPORATION BY REFERENCE

This present disclosure claims the benefit of U.S. Provisional Application No. 62/220,367, "Update on Adaptive TPC and CCA" filed on Sep. 18, 2015, which is incorporated herein by reference in its entirety.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

A wireless local area network (WLAN) is used in home, school, office building, store, and the like to link two or more devices using wireless connections within a limited area to a network. The WLAN allows users to move around within the limited area and still be connected to the network. In addition, the WLAN can be configured to provide connections to other network, such as, a wide area network, Internet and the like. Generally, WLANs are implemented based on standards, such as IEEE 802.11 standards, and the like.

SUMMARY

Aspects of the disclosure provide an apparatus for wireless communication. The apparatus includes a transceiver and a processing circuit. The transceiver is configured to receive wireless signals in air, and transmit wireless signals in the air. The processing circuit is configured to receive guiding information for spatial re-use that is carried by a wireless signal transmitted from another apparatus in a same service set with the apparatus, determine wireless information surrounding the apparatus based on the received wireless signals, determine spatial re-use parameters following the guiding information and based on the wireless information surrounding the apparatus, and control the transceiver based on the determined spatial re-use parameters to control transmission concurrently with ongoing wireless communication in one or more other service sets that overlap with the service set.

In an embodiment, the processing circuit is configured to determine a relationship between a signal preamble detection threshold and a transmit power level for spatial re-use based on the guiding information. The signal preamble detection threshold is used to discard received signals from the other service sets with a signal strength below the signal preamble detection threshold.

According to an aspect of the disclosure, the processing circuit is configured to receive the guiding information that includes at least one of a minimum value for the signal preamble detection threshold, a maximum for the signal preamble detection threshold, and a reference value for the transmit power level.

In an embodiment, the processing circuit is configured to receive a maximum value and a minimum value for the signal preamble detection threshold, and a reference value for the transmit power level, and construct a proportional relationship based on the maximum value, the minimum value and the reference value. In an example, the processing circuit is configured to determine a transmit power level not to cause interference with the ongoing wireless communication in one or more other service sets and determine the signal preamble detection threshold according to the relationship between the signal preamble detection threshold and the transmit power level. Further, the processing circuit is configured to determine the transmit power level to enable wireless communication in the service set.

In an embodiment, the guiding information for spatial re-use is carried by the wireless signal transmitted from an access point (AP) of the service set, the AP of the service set determines and varies the guiding information based on wireless communication of the service set and wireless communication of the one or more other service sets.

Aspects of the disclosure provide a method of wireless communication. The method includes receiving, by a processing circuit in a device, guiding information for spatial re-use that is carried by a wireless signal transmitted from another device in a same service set with the device, determining wireless information surrounding the device based on wireless signals received by the device, determining spatial re-use parameters following the guiding information and based on the wireless information surrounding the device and controlling transceiver in the device based on the determined spatial re-use parameters to control transmission concurrently with ongoing wireless communication in one or more other service sets that overlap the service set.

Aspects of the disclosure provide a non-transitory computer readable medium storing program instructions for causing a processor in a device to execute operations for controlling wireless communication. The operations comprise receiving guiding information for spatial re-use that is carried by a wireless signal transmitted from another device in a same service set with the device, determining wireless information surrounding the device based on wireless signals received by the device, determining spatial re-use parameters following the guiding information and based on the wireless information surrounding the device, and controlling transceiver in the device based on the determined spatial re-use parameters to control transmission concurrently with ongoing wireless communication in one or more other service sets that overlap the service set.

BRIEF DESCRIPTION OF THE DRAWINGS

Various embodiments of this disclosure that are proposed as examples will be described in detail with reference to the following figures, wherein like numerals reference like elements, and wherein.

DETAILED DESCRIPTION OF EMBODIMENTS

Figure 1:
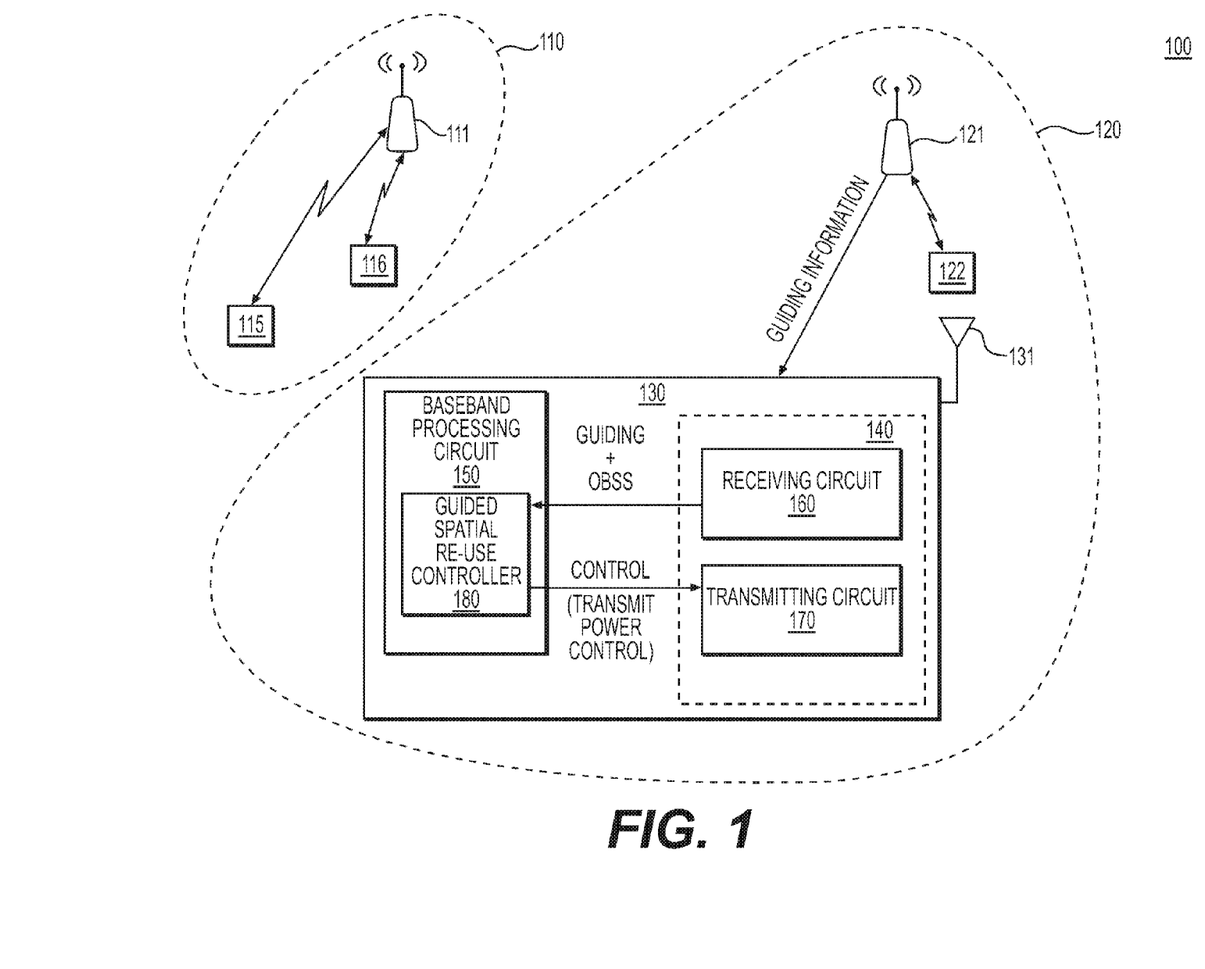
FIG. 1 shows a diagram of a network 100 according to an embodiment of the disclosure.

FIG. 1 shows a diagram of a network 100 according to an embodiment of the disclosure. The network 100 includes a plurality of service sets, such as a first basic service set (BSS) 110, a second BSS 120, and the like. Each service set includes a plurality of devices in wireless communication. For example, the first BSS 110 includes devices 111, 115, 116 and the like in wireless communication, and the second BSS 120 includes devices 121, 122, 130 and the like in wireless communication. In the network 100, at least one device, such as the device 130, is configured to receive guiding information that is determined by a managing device, such as an access point (AP) device and the like, and to perform guided adaptive spatial re-use to adjust parameters for spatial re-use based on wireless environment surrounding the device and adjust the parameters following the guiding information. The guided adaptive spatial re-use enables the device 130 to transmit concurrently with ongoing wireless communication in one or more other service sets according to the wireless environment of the network 100 and the wireless environment of the device 130 itself.

The network 100 includes interconnections that are implemented using any suitable network technology, such wired, wireless, a local area network (LAN), a wireless LAN (WLAN), a fiber optical network, a wide area network (WAN), a peer-to-peer network, the Internet, and the like. In an example, the first BSS 110 is implemented using WLAN technology to interconnect the devices 111, 115, 116 and the like; the second BSS 120 is implemented using WLAN technology to interconnect the devices 121, 122, 130 and the like; and the network 100 includes other suitable interconnections (not shown), such as a LAN, a fiber optical network, and the like to provide connections for the first BSS 110 and the second BSS 120 to be connected to for example Internet. It is noted that, in an example, the first BSS 110 and the second BSS 120 belong to a same WLAN; and in another example, the first BSS 110 and the second BSS 120 belong to different WLANs.

According to an aspect of the disclosure, the second BSS 120 is an overlapping basic service set (OBSS) to the first BSS 110. In an embodiment, the first BSS 110 and the second BSS 120 are infrastructure type basic service sets. The first BSS 110 includes an access point (AP) device 111, and station (STA) devices 115 and 116. The STA devices 115 and 116 communicate through the AP device 111, and the AP device 111 includes network hardware and software configured to serve as a bridge to allow the STA devices 115 and 116 to connect to other part of the network 100. Similarly, the second BSS 120 includes an AP device 121, and STA devices 122 and 130. The STA devices 122 and 130 communicate though the AP device 121, and the AP device 121 includes network hardware and software configured to serve as a bridge to allow the STA devices 122 and 130 to connect to other part of the network 100. In the embodiment, the AP device 111 and the STA device 115 communicate using a first frequency channel, and the AP device 111 is configured to cover a first service area. The AP 121 and the STA device 130 communicate using a second frequency channel, and the AP device 121 is configured to cover a second service area. In the embodiment, the second frequency channel overlaps the first frequency channel, and the second service area overlaps the first service area, thus the second BSS 120 is an OBSS to the first BSS 110.

Each of the STA devices in the network 100, such as the STA devices 115, 116, 122 and 130, can be any suitable device, such as a desktop computer, a laptop computer, a tablet computer, a smart phone, a personal digital assistant (PDA), a smart watch, a smart camera, a smart TV, a smart voice recorder, a wearable device, and the like. According to an aspect of the disclosure, the STA devices in the network 100 are implemented using the same version or different versions of a wireless standard, such as various IEEE 802.11 standards. In an example, the STA device 115 is implemented in IEEE 802.11 legacy standard (e.g., IEEE 802.11-1997); and the other STA devices, such as the STA devices 116, 122 and 130 are implemented in recent versions of IEEE 802.11 standards.

According to an aspect of the disclosure, the second BSS 120 is a managed basic service set in which the AP device 121 is configured to determine a wireless environment surrounding the second BSS 120 and to make a decision on spatial re-use adjustment for the STA devices in the second BSS 120 based on the determined wireless environment, and inform the decision on spatial reuse adjustment in a form of guiding information to the STA devices in the second BSS 120. In an embodiment, the AP device 121 makes decision for individual STA device, such as the STA device 130 and the like, and informs the decision to the individual STA device. In another embodiment, the AP device 121 makes decision for a group of STA devices, such as a group including the STA device 122 and the STA device 130, and informs the decision to the group of STA devices.

It is noted that, in an embodiment, the guiding information can be provided as a command from the managing device, such as the AP device 121, to devices in the managed basic service set. In the embodiment, when a device in the managed basic service set, such as the device 130, receives the command, the device needs to operate according to the guiding information of the command.

In an embodiment, the first BSS 110 and the second BSS 120 belong to an Enterprise WLAN. The Enterprise WLAN includes multiple access point devices, such as the AP device 111, the AP device 121, and the like distributed in a managed area, such as office area, university campus, a convention center, a hotel, and the like. In an example, the access point devices are densely distributed in an office area to provide various benefits, such as improved wireless coverage, improved user experience, improved data rate, and the like. The access point devices communicate via wired connection or wireless connections to detect wireless environment under different scenarios.

For example, during office hours (e.g., 8 am to 5 pm in a day), the office area is crowded with people with mobile devices, such as smartphones, tablet computers, laptop computers, and the like. The mobile devices are configured to join the Enterprise WLAN as STA devices. Due to the large number of STA devices, there is a relatively large possibility of OBSS situation. Outside office hours, the Enterprise WLAN has much less number of active STA devices, and has a much smaller possibility of OBSS situation. In an example, an AP device, such as the AP device 111, the AP device 121, and the like communicates with other AP devices via wired or wireless connections to detect characteristic of the wireless environment of the WLAN, such as a number of STA devices in the wireless environment. In another example, the Enterprise WLAN includes a WLAN controller configured to collect information from the AP devices and detect characteristics of the wireless environment. In another example, an AP device of a specific BSS, such as the AP device 121, and the like communicates with neighboring AP devices, such as the AP device 111 and the like, via wired or wireless connections to detect characteristic of the wireless environment surrounding the specific BSS.

It is noted that the AP device can detect other suitable information of the wireless environment that can be used by the AP device to vary the guiding information. In an example, the AP device is configured to detect a number of STA devices that use IEEE 802.11 legacy standard in the wireless environment. In another example, the AP device collects priority information of STA devices in the wireless environment.

In another embodiment, the first BSS 110 and the second BSS 120 belong to individual WLANs. In an example, the first BSS 110 and the second BSS 120 belong to individual home WLANs that are setup in an apartment complex. In the example, the apartment complex includes a large number of apartment units, and individual WLANs are setup in the apartment units. The wireless environment for a BSS varies with neighbor activities. For example, during daytime, neighbors go to school, or work, there is less wireless communication activity in the environment. In the night, neighbors return home, and wireless network in the neighbor units is heavily used. In an example, an AP device, such as the AP device 121, listens, and detects wireless signals from other BSS, such as beacon signals from the AP 111 in first BSS 110, and determines information of the wireless environment.

Further, in an embodiment, the AP device, such as the AP device 121, varies the guiding information based on information of the wireless environment. In an example, during the office hours, an AP device in an Enterprise WLAN detects a relatively large number of STA devices in the wireless environment, thus the AP device varies the guiding information to encourage spatial reuse; and outside office hours, the AP device detects a relatively small number of STA devices in the wireless environment, thus the AP device varies the guiding information to discourage spatial reuse. In another example, in night time, an AP device in a home WLAN detects heavy wireless usage in the neighboring BSS, thus, the AP device varies the guiding information to encourage spatial reuse; and in the daytime, the AP device detects less wireless usage in the neighboring BSS, thus the AP device varies the guiding information to discourage spatial reuse.

It is noted that the AP device can vary the guiding information for other suitable purpose, such as to ensure fairness to devices using legacy standards, and the like. It is also noted that, in an embodiment, AP device uses specific signals to carry the guiding information, thus the guiding information is provided at a less frequent basis from packet exchanges. In an example, the AP device includes the guiding information in a beacon signal, and transmits the beacon signal. In another example, the AP device includes the guiding information in a probe response, and transmits the probe response. For example, when the STA device 130 performs an association process with the AP device 121, the AP device 121 provides the guiding information to the STA device 130 during the association process.

It is noted that the guiding information can include any suitable information to assist parameter adjustment for spatial reuse. In an example, the guiding information is used to adjust a signal preamble detection threshold that is used for clear channel assessment in OBSS environment (OBSS-PD). It is noted that the guiding information can be used to adjust other suitable threshold values in the OBSS environment for the purpose of clear channel assessment (CCA). In an example, the guiding information includes a maximum value for the signal preamble detection threshold. In another example, the guiding information includes a minimum value for the signal preamble detection threshold. In another example, the guiding information includes a reference value for a transmit power level. In an embodiment, the guiding information includes a relationship between the signal preamble detection threshold and the transmit power level. The relationship can be represented in any suitable form. In an example, the relationship is defined according to a proportional rule for the signal preamble detection threshold and the transmit power level. In the example, an increase in the signal preamble detection threshold is proportional to a decrease in the transmit power level. In an example, the relationship is defined using three values, such as a minimum value (PDmin) of the signal preamble detection threshold, a maximum value (PDmax) of the signal preamble detection threshold, and a reference transmit power level (TXPref). Thus, the relationship of signal preamble detection threshold in OBSS environment (OBSS_PD) and associated transmit power (TXP) is represented using Eq. 1:

$$OBSS\_PD = \max[PDmin, \min(PDmax, PDmin+TXPref-TXP)] \quad \text{Eq. 1}$$

In an example, the minimum value PDmin, the maximum value PDmax, the signal preamble detection threshold in OBSS environment OBSS_PD, the reference transmit power level TXPref and the transmit power TXP are in the unit of dBm which is an abbreviation for the power ratio in decibels (dB) of the measured power referenced to one milliwatt (mW).

In an example, Eq. 1 is used for a channel of 20 MHz. For example, the PDmin is the minimum value of the signal preamble detection threshold for a channel of 20 MHz bandwidth, the PDmax is the maximum value of the signal preamble detection threshold for a channel of 20 MHz bandwidth, the OBSS PD is the signal preamble detection threshold for a channel of 20 MHz bandwidth. Eq. 1 can be suitable modified to be used for channels of different bandwidth. In an example, the signal preamble detection threshold for a channel of a bandwidth (BW) is represented using Eq. 2.

$$PD(BW) = \max[PDmin(BW), \min(PDmax(BW), PDmin(BW)+TXPref-TXP)] \quad \text{Eq. 2}$$

where PD(BW) denotes the signal preamble detection threshold of a channel of BW bandwidth, PDmin(BW) denotes the minimum value of the signal preamble detection threshold for a channel of BW bandwidth, PDmax(BW) denotes the maximum value of the signal preamble detection threshold for a channel of BW bandwidth. PDmin(WW) and PDmax(BW) can be calculated according to Eq. 3 and Eq. 4:

$$PDmin(BW) = PDmin + 10 \times \log\left(\frac{BW}{20 \text{ MHz}}\right) \quad \text{Eq. 3}$$

$$PDmax(BW) = PDmax + 10 \times \log\left(\frac{BW}{20 \text{ MHz}}\right) \quad \text{Eq. 4}$$

It is noted that the guiding information can be represented in other suitable proportional or non-proportional relationship. In an example, the guiding information includes multiple pairs of signal preamble detection threshold and associated transmit power level, and linear interpolation is used to determine the transmit power level associated with a specific signal preamble detection threshold.

According to an aspect of the disclosure, the AP 121 can use any suitable signal, such as a beacon signal, a probe response signal, an authentication response signal, an association response signal and the like to carry the guiding information. In an embodiment, the AP 121 includes an information element (e.g., spatial reuse element) in a digital stream, and emits electromagnetic waves (wireless signals) in air to carry the digital stream. In an example, the information element includes for example the minimum value of the signal preamble detection threshold, the maximum value of the signal preamble detection threshold, and the reference value of the transmit power level. Thus, the proportional relationship between the signal preamble detection threshold and the transmit power level can be constructed based on the information element.

When a STA device, such as the STA device 130, receives the guiding information from the AP 121, the STA device 130 uses the guiding information to construct the relationship between the signal preamble detection threshold and the transmit power level. Further, the STA device 130 detects wireless environment surrounding the STA device 130 itself, and then determines the spatial re-use parameters, such as the signal preamble detection threshold and the transmit power level, based on the detected wireless environment and according to the relationship.

Specifically, in the FIG. 1 example, the STA device 130 includes a transceiver circuit 140 and a baseband processing circuit 150 coupled together as shown in FIG. 1. In the example, the transceiver circuit 140 includes a receiving circuit 160 and a transmitting circuit 170 that are both coupled to an antenna 131, and the baseband processing circuit 150 includes a guided spatial re-use controller 180.

It is noted that in an example, the STA device 130 can include multiple antennas, and the receiving circuit 160 and the transmitting circuit 170 can be coupled to separate antennas.

The transceiver circuit 140 is configured to receive and transmit wireless signals. For example, the receiving circuit 160 is configured to generate electrical signals in response to captured electromagnetic waves by the antenna 131, process the electrical signals to extract digital streams from the electrical signals. In an example, the transmitting circuit 170 is configured to receive digital streams, such as management frames, data frames, and the like from for example the baseband processing circuit 150, generate radio frequency (RF) signals to carry the digital streams, and emit electromagnetic waves in the air via the antenna 131 to transmit wireless signals that carry the digital streams.

Specifically, in an embodiment, the receiving circuit 160 is configured to receive wireless signals from various sources. In an example, the receiving circuit 160 is configured to generate electrical signals in response to wireless signals emitted by the AP 121 that carry the guiding information. In the example, the receiving circuit 160 processes the electrical signals and extracts digital streams that include the guiding information, such as an information element for spatial reuse. The digital streams are provided to the baseband processing circuit 150 for further processing. It is noted that the digital streams can include other suitable information.

In addition, in the example, the receiving circuit 160 is configured to generate electrical signals in response to wireless signals emitted by devices in other BSS. In an example, the first BSS 110 is an overlapping BSS (OBSS) for the second BSS 120. The STA 130 is able to generate electrical signals in response to the wireless signals emitted by devices in the first BSS 110, such as the AP 111, the STA devices 115 and 116. In the example, the receiving circuit 160 processes the electrical signals. For example, the receiving circuit 160 extracts digital streams sent by devices in the OBSS that include various information of the OBSS. The digital streams are provided to the baseband processing circuit 150 for further processing. It is noted that the digital streams can include other suitable information.

It is noted that receiving circuit 160 can extract other suitable information of the received wireless signals, such as signal strengths of the wireless signals, and the like. In an embodiment, the extracted information by the receiving circuit 160 is indicative of wireless environment surrounding the STA 130. The extract information is provided to the baseband processing circuit 150 for further processing.

According to an aspect of the disclosure, the transmitting circuit 170 also receives control signals, such as a transmit power control signal and the like, from the baseband processing circuit 150. In an example, the transmitting circuit 170 is configured to emit wireless signals with a power controlled according to the transmit power control signal.

The baseband processing circuit 150 is configured to perform various processing in baseband. The baseband processing circuit 150 can be implemented using any suitable technology. In an embodiment, the baseband processing circuit 150 is implemented using pure circuits.

In another embodiment, the baseband processing circuit 150 is implemented using a processor (not shown) and memory circuit (not shown). The memory circuit is configured to store data and software instructions. The processor is configured to execute software instructions to process data. In an example, the guided spatial re-use controller 180 is implemented as a processor executing software instructions. For example, the memory circuit stores software instructions for controlling guided adaptive spatial re-use, and the processor executes the software instructions to perform operations for controlling guided adaptive spatial re-use.

According to an aspect of the disclosure, the guided spatial re-use controller 180 is configured to control spatial re-use according to the wireless environment surrounding the STA 130 and following the guiding information determined by the AP 121. In an embodiment, the AP 121 is configured to determine the guiding information based on wireless environment in a relative larger area than the second BSS 120. In an example, such as an Enterprise WLAN example, the AP 121 is configured to be able to communicate with other APs, thus the AP 121 has a knowledge of the wireless environment of other BSS in the WLAN, or has a knowledge of the entire WLAN. In another example, such as an apartment complex example, the AP 121 is configured to listen to signals sent by other APs, thus the AP 121 has a knowledge of the wireless environment of other BSSs in other apartment units. In an embodiment, the AP 121 varies the guiding information with a relatively large interval, such as with an interval of one or more minutes.

Further, in an embodiment, the guided spatial re-use controller 180 determines wireless environment surrounding the STA 130 itself with a relatively small interval, such as with an interval of one or more seconds. In an example, the guided spatial re-use controller 180 tracks received signal power ($RSP_{AP121\text{-}STA130}$) of wireless signals emitted by the AP 121, and other devices. For example, when the received signal power of wireless signals emitted by the AP 121 increases, the guided spatial re-use controller 180 determines that the STA 130 moves closer to the AP 121; and when the received signal power of wireless signals emitted by the AP 121 decreases, the guided spatial re-use controller 180 determines that the STA 130 moves away from the AP 121. In another example, the guided spatial re-use controller 180 has knowledge of the AP 121, such as a transmit power level (TXP121) of the AP 121, the guided spatial re-use controller 180 determines a path loss ($LOSS_{AP121\text{-}STA130}$) between the AP 121 and the STA 130.

The guided spatial re-use controller 180 also determines spatial re-use information associated with devices in other BSSs, such as the STA device 115 and the like. In an embodiment, the guided spatial re-use controller 180 detects on-going wireless communication in other BSSs, such as the first BSS 110, and the like. For example, the guided spatial re-use controller 180 receives a data stream extracted from wireless signals that are emitted by the STA 115 in the first BSS 110. The data stream includes information about the STA 115 and about the first BSS 110. For example, the data stream includes flags that are indicative of the first BSS 110, includes transmit power information ($TXP_{STA115}$) of the STA 115, and includes received signal power ($RSP_{AP111\text{-}STA115}$) by the STA 115 of wireless signals emitted from the AP 111. It is noted that the information of the received signal power by the STA 115 of wireless signals emitted from the AP 111 can be included in other form, such as received signal strength indicator (RSSI), and the like. The guided spatial re-use controller 180 determines that the wireless signals that carry the data stream are emitted from for example, the first BSS 110. Further, the guided spatial re-use controller 180 compares received signal power ($RSP_{STA115\text{-}STA130}$) of the wireless signals and transmit power information ($TXP_{STA115}$) to determine a path loss ($LOSS^{STA115\text{-}STA130}$) from the STA device 115 to the STA 130.

Further, the guided spatial re-use controller 180 determines spatial re-use parameters, such as the signal preamble detection threshold, the transmit power level, and the like based on the guiding information and the wireless environment surrounding the STA 130. In an embodiment, the guided spatial re-use controller 180 determines a range of transmit power level (TXP130) that would not cause interference to the on-going wireless communication in other BSSs. For example, the guided spatial re-use controller 180 determines a range of transmit power level to satisfy Eq. 5 in order not to cause interference to the on-going wireless communication at STA 115:

$$TXP130 - LOSS_{STA115\text{-}STA130} < RSP_{AP111\text{-}STA115} \quad \text{Eq. 5}$$

In an example, when a margin (MARGIN) is required, the guided spatial re-use controller 180 determines the range of transmit power level to satisfy Eq. 6:

$$TXP130 - LOSS_{STA115\text{-}STA130} < RSP_{AP111\text{-}STA115} - \text{MARGIN} \quad \text{Eq. 6}$$

In an example, the margin is a fixed positive value.

In addition, the guided spatial re-use controller 180 has a knowledge of a minimum transmit power level ($TXP130_{MIN}$) requirement ($TXP130 > TXP130_{MIN}$) in order to communicate with the AP 121. In an embodiment, the guided spatial re-use controller 180 suitably selects a transmit power level (TXP130) that satisfies Eq. 6 and the minimum transmit power level requirement. When such transmit power level does not exist, the guided spatial re-use controller 180 determines not to transmit concurrently with ongoing wireless communication in the first BSS 110.

Further, according to an aspect of the disclosure, the guided spatial re-use controller 180 determines the signal preamble detection threshold (PD130) associated with the determined transmit power level (TXP 130) according to the guiding information that specifies the relationship between the signal preamble detection threshold and the transmit power level. In an example, the guided spatial re-use controller 180 determines the signal preamble detection threshold (PD130) associated with the determined transmit power level (TXP130) according to, for example, Eq. 1 or Eq. 2.

100521 Then, the guided spatial re-use controller 180 controls spatial re-use according to the signal preamble detection threshold and the transmit power level. For example, the guided spatial re-use controller 180 uses the signal preamble detection threshold to determine whether a channel is clear, and provides transmit power control signal to the transmitting circuit 170 based on the transmit power level. In an example, when the STA 130 receives wireless signals carrying data unit from the first BSS 110, the receiving circuit 160 generates electrical signals in response to the wireless signals, and extracts a data stream from the electrical signals. In addition, the receiving circuit 160 detects received signal power. The baseband processing circuit 150 then processes the data stream. For example, the baseband processing circuit 150 extracts the data unit, and determines that the data unit is from an OBSS. Then, the guided spatial re-use controller 180 compares the received signal power to the signal preamble detection threshold. When the received signal power is lower than signal preamble detection threshold, the guided spatial re-use controller 180 determines that the channel is clear, and thus the STA 130 can initiate transmission according to the transmit power level to transmit concurrently with ongoing wireless communication in one or more other service sets.

Specifically, in an example, when the STA 130 receives, from a wireless communication channel, a wireless signal carrying a data unit (e.g., protocol data unit PPDU) and before the data unit is extracted, the signal strength of the wireless signal is compared to a first threshold to trigger a clear channel assessment (CCA). For example, when the signal strength is higher than the first threshold, the wireless communication channel is set busy and the CCA is triggered. When the CCA is triggered, the signal strength of the wireless signal is compared with the signal preamble detection threshold for the OBSS environment. When the signal strength is below the signal preamble detection threshold and after the data unit is extracted, the baseband processing circuit 150 can detect whether the data unit is from an overlapping basic service set (e.g., the second BSS 110). In an example, the baseband processing circuit 150 detects the preamble portion of the data unit to look for BSS color information. The BSS color information is indicative of which BSS the data unit comes from. For example, when the BSS color indicates that the data unit is transmitted from the first BSS 110, the baseband processing circuit 150 determines that the wireless signal that carries the data unit is from the overlapping basic service set. Further, when the baseband processing circuit 150 detects that the wireless signal that carries the data unit is from the overlapping basic service set, the baseband processing circuit 150 discards the data unit, resets the wireless communication channel to be idle, ignores the received wireless signal, and not to update the network allocation vector (NAV). In an example, the STA 130 can continue to backoff, and operate like the wireless signal that carries the data unit is never received. The use of the signal preamble detection threshold in spatial reuse is disclosed in Applicant's co-pending application Ser. No. 15/019,849, "Adaptive CCA and TX Power Level Adjustment for Dense Deployment of Wireless Networks" filed Feb. 9, 2016, which is incorporated herein by reference in its entirety.

According to an aspect of the disclosure, the network 100 is a managed network to achieve a best result to control the inter-BSS interference. In an example, the network 100 is an extended service set (ESS) that interconnects multiple basic service sets (BSSs), such as the first BSS 110 and the second BSS 120, and the multiple BSSs are under a same management entity. In the example, the guiding information is very useful to achieve much higher throughput as compared to an unmanaged network.

Figure 2:
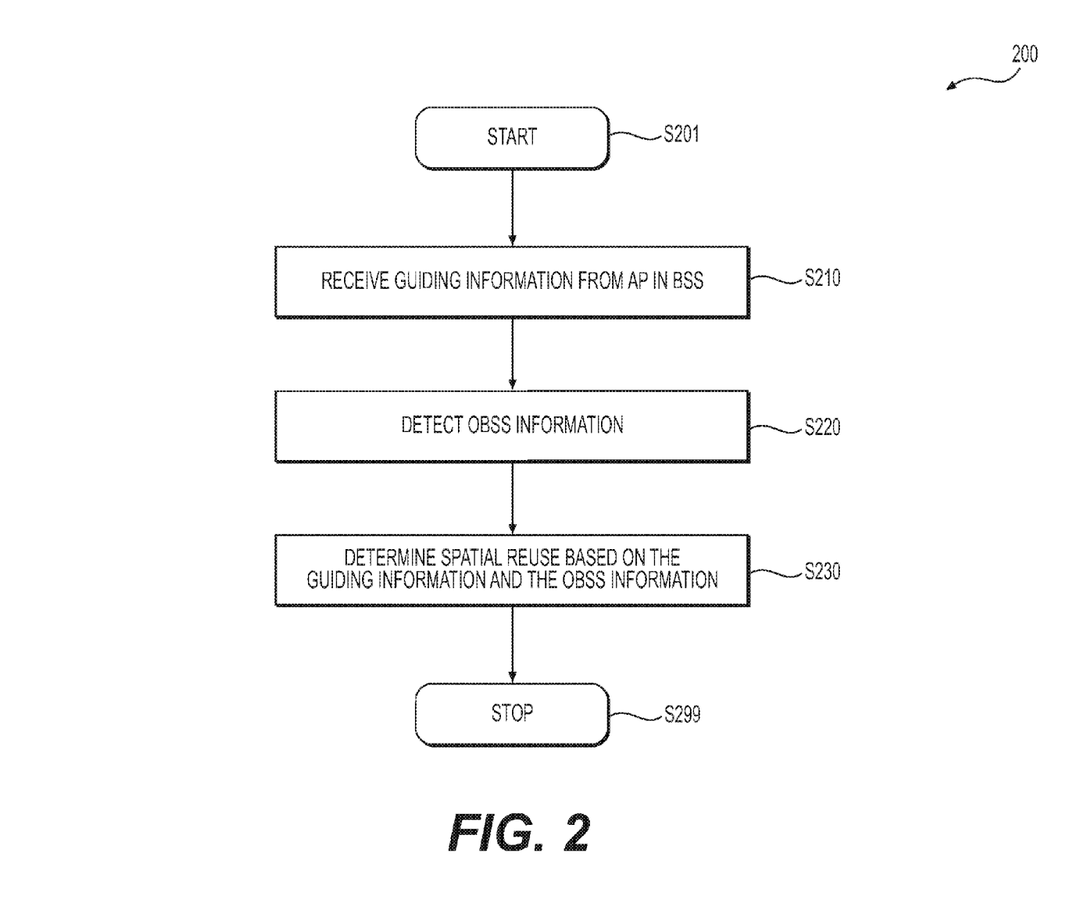
FIG. 2 shows a flow chart outlining a process 200 according to an embodiment of the disclosure.

FIG. 2 shows a flow chart outlining a process example 200 according to an embodiment of the disclosure. In an example, the process 200 is executed by the guided spatial re-use controller 180 in the FIG. 1 example. The process starts at S201 and proceeds to S210.

At S210, guiding information from an AP device is received. In the FIG. 1 example, the second BSS 120 is a managed BSS. In the second BSS 120, the AP device 121 observes wireless environment surrounding the second BSS 120, such as an extended service set that includes the second BSS 120, neighboring BSSs of the second BSS 120, and the like, and varies guiding information for the STA device 130 based on the wireless environment. The AP device 121 then transmits wireless signals carrying the guiding information. The STA 130 receives the wireless signals, the receiving circuit 160 obtains a data stream in response to the wireless signals, and the guided spatial re-use controller 180 extracts the guiding information from the data stream. In an example, the guiding information includes a maximum value of the signal preamble detection threshold. In another example, the guiding information includes a minimum value of the signal preamble detection threshold. In another example, the guiding information includes a reference value of transmit power level. In another example, the guiding information includes the minimum value of the signal preamble detection threshold, the maximum value of the signal preamble detection threshold, the reference value of transmit power level, and an indicator of a proportional rule.

It is noted that, in an example, the guided spatial re-use controller 180 obtains other suitable information from the wireless signals emitted from the AP device 121, such as received signal power of the wireless signals, a minimum transmission power level for the STA 130 that is determined by the AP device 121, and the like.

At S220, overlapping BSS information is detected. In the FIG. 1 example, the STA device 130 observes OBSS information. For example, the STA device 130 receives wireless signals emitted by devices in other BSS, such as the STA 115, and the like in the same channel used by the STA device 130, or in a channel that overlaps with the STA 130 channel. The STA device 130 determines that the first BSS 110 is an overlapping BSS, and observes suitable information from the wireless signals emitted by for example the STA 115. For example, wireless signals emitted by the STA 115 carry flags (e.g., BSSID) that are indicative of the first BSS 110, transmit power information (TXP$_{STA115}$) of the STA 115, and received signal power (RSP$_{AP111\text{-}STA115}$) by the STA 115 of wireless signals emitted from the AP 111. The receiving circuit 160 obtains a data stream in response to the wireless signals. The guided spatial re-use controller 180 extracts the flags from the data stream and determines that the wireless signals that carry the data stream are emitted from for example, the first BSS 110. Further, the receiving circuit 160 determines received signal power (RSP$_{STA115\text{-}STA130}$) of the wireless signals, the guided spatial re-use controller 180 extracts the transmit power information (TXP$_{STA115}$) from the data stream. Then, the guided spatial re-use controller 180 compares the received signal power (RSP$_{STA115\text{-}STA130}$) of the wireless signals and the transmit power information (TXP$_{STA115}$) to determine a path loss (LOSS$_{STA115\text{-}STA130}$) from the STA device 115 to the STA 130.

At S230, spatial re-use parameters are determined based on the guiding information and the OBSS information. In an example, the guided spatial re-use controller 180 determines a range of transmit power level (TXP130) that would not cause interference to the on-going wireless communication in other BSSs. For example, the guided spatial re-use controller 180 determines a range of transmit power level to satisfy Eq. 6 in order not to cause interference to the on-going wireless communication at STA 115.

Further, the guided spatial re-use controller 180 suitably selects a transmit power level (TXP130) that satisfies Eq. 6 and the minimum transmit power level requirement. When such transmit power level does not exist, the guided spatial re-use controller 180 determines not to transmit concurrently with ongoing wireless communication in the first BSS 110.

Further, according to an aspect of the disclosure, the guided spatial re-use controller 180 determines the signal preamble detection threshold (PD 130) associated with the determined transmit power level (TXP130) according to the guiding information. In an example, the guiding information specifies a relationship between the signal preamble detection threshold and the transmit power level, such as the relationship shown in Eq. 2. In the example, the guided spatial re-use controller 180 determines the signal preamble detection threshold (PD130) associated with the determined transmit power level (TXP130) according to, for example Eq. 2.

Then, the guided spatial re-use controller 180 controls spatial re-use according to the signal preamble detection threshold and the transmit power level. The process proceeds to S299 and terminates.

Figure 3:
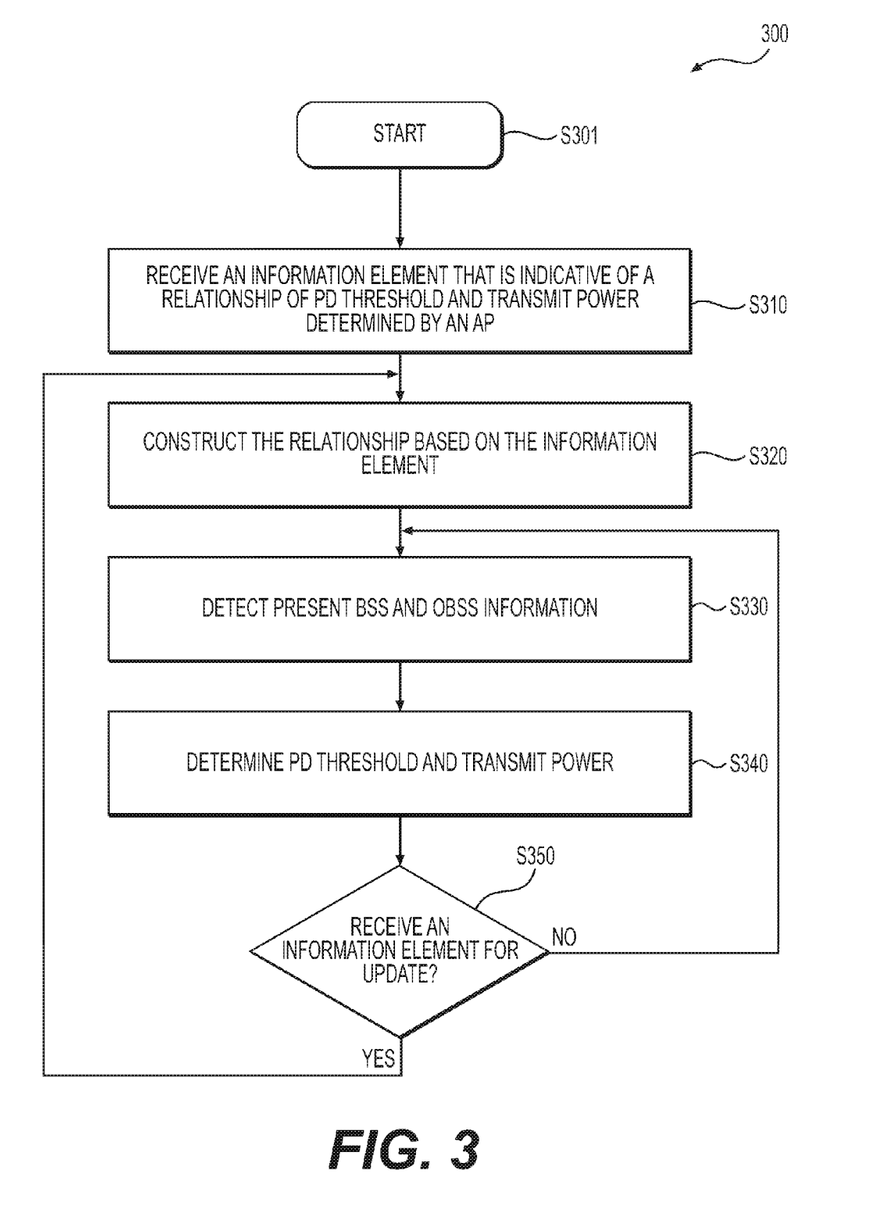
FIG. 3 shows a flow chart outlining a process 300 according to an embodiment of the disclosure.

FIG. 3 shows another flow chart outlining a process 300 according to an embodiment of the disclosure. In an example, the process 300 is executed by the guided spatial re-use controller 180 in the FIG. 1 example. The process starts at S301 and proceeds to S310.

At S310, an information element is received. The information element is indicative of a relationship of signal preamble detection threshold and transmit power level. The relationship is determined by for example the AP 121. In the FIG. 1 example, the second BSS 120 is a managed BSS. In the second BSS 120, the AP device 121 observes wireless environment surrounding the second BSS 120, and varies the relationship for the STA device 130 based on the wireless environment. The AP device 121 then transmits wireless signals carrying the information element. The STA 130 receives the wireless signals, the receiving circuit 160 obtains a data stream in response to the wireless signals, and the guided spatial re-use controller 180 extracts the information element from the data stream. In an example, the information element includes the minimum value of the signal preamble detection threshold, the maximum value of the signal preamble detection threshold, the reference value of transmit power level, and an indicator of a proportional rule.

It is noted that, in an example, the guided spatial re-use controller 180 obtains other suitable information from the wireless signals emitted from the AP device 121, such as received signal power of the wireless signals, a minimum transmission power level for the STA 130 that is determined by the AP device 121, and the like.

At S320, the relationship is constructed based on the information element. In an example, the guided spatial re-use controller 180 constructs the relationship according to for example Eq. 2.

At S330, present BSS and OBSS information is detected. In the FIG. 1 example, the STA device 130 observes BSS information and OBSS information. For example, the STA 130 receives wireless signals from the AP device 121, the receiving circuit 160 determines received signal power of the wireless signals from the AP device 121, and the guided spatial re-use controller 180 tracks the received signal power of the wireless signals from the AP device 121. For example, when the received signal power of the wireless signals from the AP device 121 decreases, the guided spatial re-use controller 180 detects a situation that the STA 130 moves away from the AP device 121.

Further, the STA device 130 receives wireless signals emitted by devices in other BSS, such as the STA 115, and the like in the same channel used by the STA device 130, or in a channel that overlaps with the STA device 130 channel. The STA device 130 determines that the first BSS 110 is an overlapping BSS, and observes suitable information from the wireless signals emitted by for example the STA 115. For example, wireless signals emitted by the STA 115 carry flags that are indicative of the first BSS 110, transmit power information ($TXP_{STA115}$) of the STA 115, and received signal power ($RSP_{AP111\text{-}STA115}$) by the STA 115 of wireless signals emitted from the AP 111. The receiving circuit 160 obtains a data stream in response to the wireless signals. The guided spatial re-use controller 180 extracts the flags from the data stream and determines that the wireless signals that carry the data stream are emitted from for example, the first BSS 110. Further, the receiving circuit 160 determines received signal power ($RSP_{STA115\text{-}STA130}$) of the wireless signals, the guided spatial re-use controller 180 extracts transmit power information ($TXP_{STA115}$) from the data stream. Then, the guided spatial re-use controller 180 compares the received signal power ($RSP_{STA115\text{-}STA130}$) of the wireless signals and the transmit power information ($TXP_{STA115}$) to determine a path loss ($LOSS_{STA115\text{-}STA130}$) from the STA device 115 to the STA 130. In an example, the guided spatial re-use controller 180 tracks changes in the path loss from the STA device 115 to the STA 130. For example, when the path loss decreases, the guided spatial re-use controller 180 detects a situation that the STA 115 and STA 130 move closer.

At S340, spatial re-use parameters are determined based on the BSS and the OBSS information. For example, the guided spatial re-use controller 180 determines a range of transmit power level to satisfy Eq. 6 in order not to cause interference to the on-going wireless communication at STA 115. Further, the guided spatial re-use controller 180 suitably selects a transmit power level (TXP 130) that satisfies Eq. 6 and the minimum transmit power level requirement for the STA 130. In an example, the guided spatial re-use controller 180 adjusts the selected transmit power level according to the received signal power of wireless signals from the AP 121.

Further, according to an aspect of the disclosure, the guided spatial re-use controller 180 determines the signal preamble detection threshold (PD130) associated with the determined transmit power level (TXP130) according to the relationship between the signal preamble detection threshold and the transmit power level, such as the relationship shown in Eq. 2.

Then, the guided spatial re-use controller 180 controls spatial re-use according to the signal preamble detection threshold and the transmit power level.

At S350, the guided spatial re-use controller 180 determines whether the STA 130 receives an update of an information element to update the relationship between the signal preamble detection threshold and the transmit power level. When the update is received, the process returns to S320 to update the relationship between the signal preamble detection threshold and the transmit power level; otherwise, the process returns to S330 to detect wireless environment surrounding the STA 130.

Figure 4:
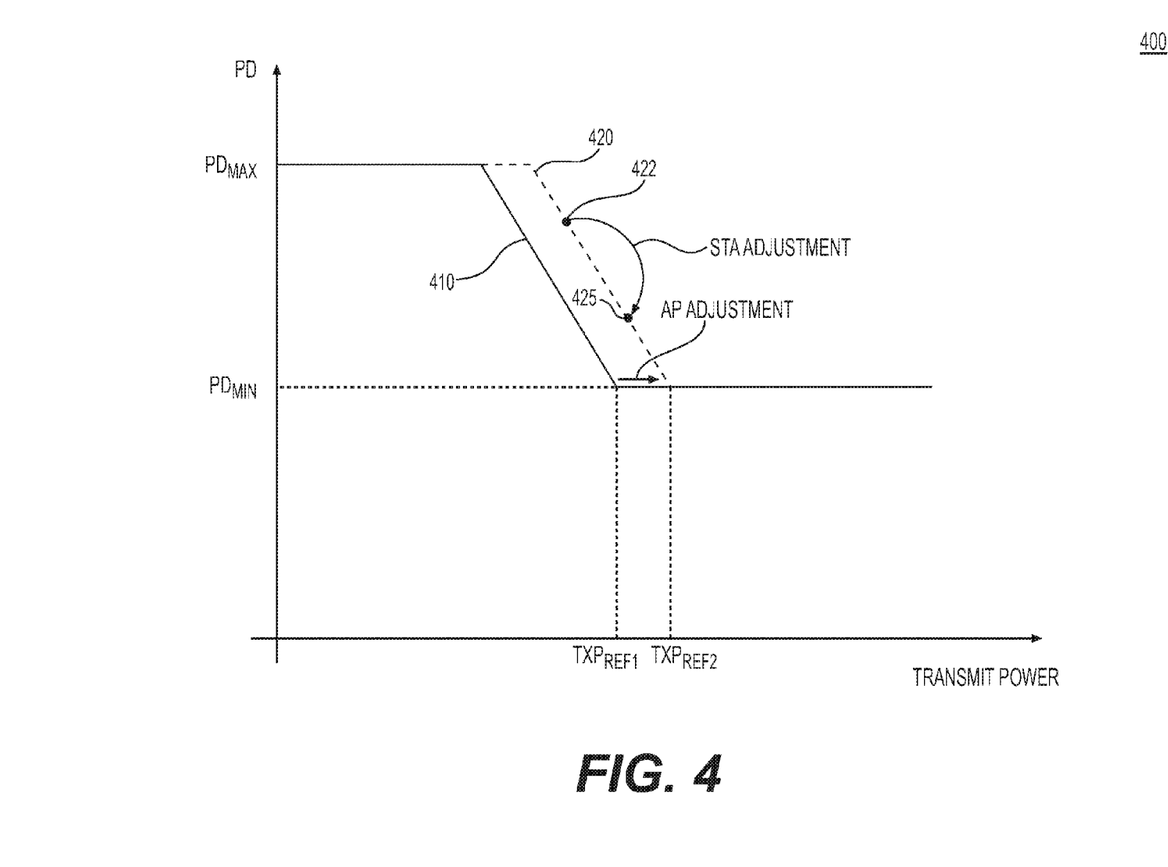
FIG. 4 shows a plot 400 for spatial re-use parameter adjustment according to an embodiment of the disclosure.

FIG. 4 shows a plot 400 for relationships between signal preamble detection threshold and transmit power level according to an embodiment of the disclosure. The X-axis represents the transmit power level, and the Y-axis represents the signal preamble detection threshold.

The plot 400 shows a first curve 410 and a second curve 420. The first curve 410 represents a first relationship between the signal preamble detection threshold and the transmit power level. The first relationship is constructed based on a maximum value ($PD_{MAX}$) of the signal preamble detection threshold, a minimum value ($PD_{MIN}$) of the signal preamble detection threshold, and a first reference value of the transmit power level ($TXP_{REF1}$). The second relationship is constructed based on the maximum value ($PD_{MAX}$) of the signal preamble detection threshold, the minimum value ($PD_{MIN}$) of the signal preamble detection threshold, and a second reference value of the transmit power level ($TXP_{REF2}$).

In an example, the first BSS 110 and the second BSS 120 belong to an Enterprise WLAN. In an example, the AP device 121 adjusts the relationship based on wireless environment of the Enterprise WLAN. For example, the AP device 121 obtains a number of STA devices in the Enterprise WLAN, and adjusts the relationship based on the number of STA devices in the Enterprise WLAN. When the number of STA devices in the Enterprise WLAN is relatively small, such as during lunch time, the AP device 121 determines to use the relationship represented by the first curve 410. When the number of STA devices in the Enterprise WLAN is relatively high, such as during peak business hours, the AP device 121 decides to encourage spatial reuse, and updates the relationship from the first curve 410 to the second curve 420.

The AP device 121 informs the STA device 130 of the relationship update. Further, the STA device 130 detects wireless environment around itself, and determines the signal preamble detection threshold and the transmit power level according to the detected wireless environment, and following the relationship determined by the AP device 121. For example, the STA device 130 detects the received signal power of wireless signals emitted by the AP device 121, when the STA device 130 detects that the STA device 130 moves away from the AP device 121, the STA device 130 adjusts the spatial re-use parameters from a first set of signal preamble detection threshold and associated transmit power represented by 422 to a second set of signal preamble detection threshold and associated transmit power represented by 425.

Figure 5:
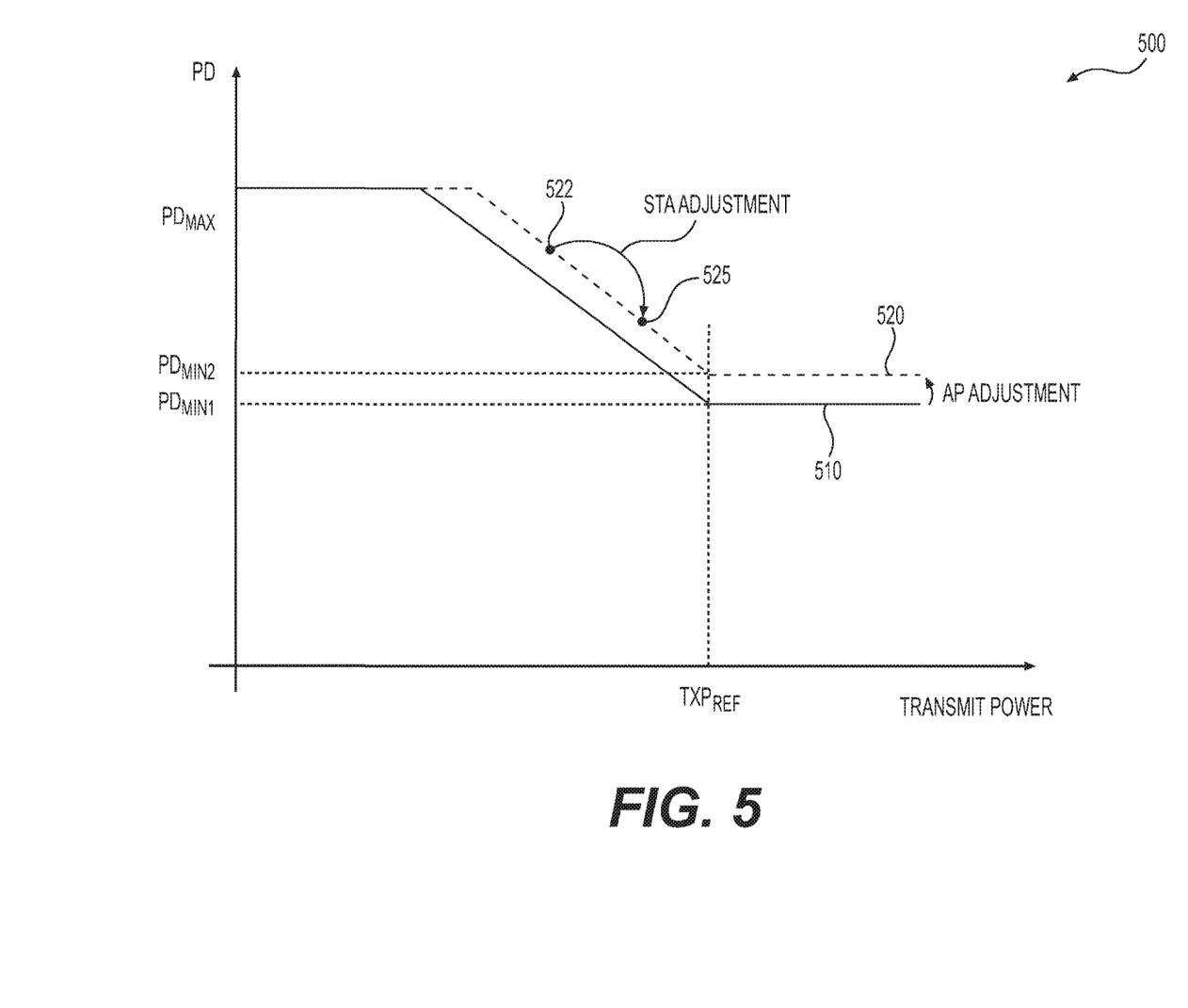
FIG. 5 shows a plot 500 for spatial re-use parameter adjustment according to an embodiment of the disclosure.

FIG. 5 shows a plot 500 for relationships between signal preamble detection threshold and transmit power level according to an embodiment of the disclosure. The X-axis represents the transmit power level, and the Y-axis represents the signal preamble detection threshold.

The plot 500 shows a first curve 510 and a second curve 520. The first curve 510 represents a first relationship between the signal preamble detection threshold and the transmit power level. The first relationship is constructed based on a maximum value ($PD_{MAX}$) of the signal preamble detection threshold, a first minimum value ($PD_{MIN1}$) of the signal preamble detection threshold, and a reference value of the transmit power level ($TXP_{REF}$). The second relationship is constructed based on the maximum value ($PD_{MAX}$) of the signal preamble detection threshold, a second minimum value ($PD_{MIN2}$) of the signal preamble detection threshold, and the reference value of the transmit power level ($TXP_{REF}$).

In an example, the first BSS 110 and the second BSS 120 belong to an Enterprise WLAN. In an example, the AP device 121 adjusts the relationship based on wireless environment of the Enterprise WLAN. For example, the AP device 121 obtains whether legacy device exists in the Enterprise WLAN, and adjusts the relationship based on the existence of legacy device in the Enterprise WLAN. When one or more legacy devices exist in the Enterprise WLAN, the AP device 121 determines to use the relationship represented by the first curve 510. When no legacy device exists in the Enterprise WLAN, the AP device 121 decides to encourage spatial reuse, and updates the relationship from the first curve 510 to the second curve 520.

The AP device 121 informs the STA device 130 of the relationship update. Further, the STA device 130 detects wireless environment around itself, and determines the signal preamble detection threshold and the transmit power level according to the detected wireless environment, and following the relationship determined by the AP device 121. For example, the STA device 130 detects the received signal power of wireless signals emitted by the AP device 121, when the STA device 130 detects that the STA device 130 moves away from the AP device 121, the STA device 130 adjusts the spatial re-use parameters from a first set of signal preamble detection threshold and associated transmit power represented by 522 to a second set of signal preamble detection threshold and associated transmit power represented by 525.

When implemented in hardware, the hardware may comprise one or more of discrete components, an integrated circuit, an application-specific integrated circuit (ASIC), etc.

While aspects of the present disclosure have been described in conjunction with the specific embodiments thereof that are proposed as examples, alternatives, modifications, and variations to the examples may be made. Accordingly, embodiments as set forth herein are intended to be illustrative and not limiting. There are changes that may be made without departing from the scope of the claims set forth below.

What is claimed is:

1. An apparatus for wireless communication, comprising:
   a transceiver configured to transmit and receive wireless signals; and
   a processing circuit configured to:
      receive guiding information for spatial re-use that is carried by a wireless signal transmitted from another apparatus in a present service set with the apparatus, the guiding information including a range of a signal preamble detection threshold or a reference value of a transmit power level for performing transmission by the apparatus;
      receive power information from another service set corresponding to ongoing wireless communication in the another service set;
      determine the transmit power level based on the received power information corresponding to the ongoing wireless communication in the another service set;
      determine the signal preamble detection threshold following the guiding information and based on the determined transmit power level; and
      control the transceiver based on the determined signal preamble detection threshold and the determined transmit power level to control the transmission concurrently with the ongoing wireless communication in the another service set,
   wherein the signal preamble detection threshold is used to discard received signals from at least one service set that is different from the present service set and with a strength below the signal preamble detection threshold.

2. The apparatus of claim 1, wherein the processing circuit is configured to:
   determine a relationship between the signal preamble detection threshold and the transmit power level based on the guiding information; and
   determine the signal preamble detection threshold based on the determined relationship and the determined transmit power level.

3. The apparatus of claim 2, wherein the processing circuit is configured to receive the guiding information that includes a minimum value for the signal preamble detection threshold, a maximum value for the signal preamble detection threshold, and the reference value for the transmit power level.

4. The apparatus of claim 3, wherein the processing circuit is configured to:
   determine the relationship as a proportional relationship based on the maximum value, the minimum value, and the reference value.

5. The apparatus of claim 1, wherein the another apparatus corresponds to an access point (AP) of the present service set, the AP of the present service set being configured to determine and vary the guiding information based on wireless communication of the present service set and wireless communication of the at least one service set that is different from the present service set.

6. The apparatus of claim 1, wherein
the another service set is an overlapping basic service set (OBSS) to the present service set.

7. The apparatus of claim 1, wherein the power information corresponding to the ongoing wireless communication in the another service set includes:
   a transmit power used by a first apparatus in the another service set to transmit a particular wireless signal, and
   a received signal power of the particular wireless signal received by a second apparatus in the another service set.

8. A method of wireless communication, comprising:
   receiving, by a processing circuit in a device, guiding information for spatial re-use that is carried by a wireless signal transmitted from another device in a present service set with the device, the guiding information including a range of a signal preamble detection threshold or a reference value of a transmit power level for performing transmission by the apparatus;
   receiving power information from another service set corresponding to ongoing wireless communication in the another service set;
   determining the transmit power level based on the received power information corresponding to the ongoing wireless communication in the another service set;
   determining the signal preamble detection threshold following the guiding information and based on the determined transmit power level; and
   controlling a transceiver in the device based on the determined signal preamble detection threshold and the determined transmit power level to control the transmission concurrently with the ongoing wireless communication in the another service set,
   wherein the signal preamble detection threshold is used to discard received signals from at least one service set that is different from the present service set and with a strength below the signal preamble detection threshold.

9. The method of claim 8, further comprising:
   determining a relationship between the signal preamble detection threshold and the transmit power level based on the guiding information; and determining the signal preamble detection threshold based on the determined relationship and the determined transmit power level.

10. The method of claim 9, wherein the guiding information includes a minimum value for the signal preamble detection threshold, a maximum value for the signal preamble detection threshold, and the reference value for the transmit power level.

11. The method of claim 10, further comprising:
determining the relationship as a proportional relationship based on the maximum value, the minimum value, and the reference value.

12. The method of claim 8, wherein
the another device corresponds to an access point (AP) of the present service set, the AP of the present service set being configured to determine and vary the guiding information based on wireless communication of the present service set and wireless communication of the at least one service set that is different from the present service set.

13. A non-transitory computer readable medium storing program instructions for causing a processor in a device to execute operations for wireless communication, the operations comprising:
receiving guiding information for spatial re-use that is carried by a wireless signal transmitted from another device in a present service set with the device, the guiding information including a range of a signal preamble detection threshold or a reference value of a transmit power level for performing transmission by the apparatus;
receiving power information from another service set corresponding to ongoing wireless communication in the another service set;
determining the transmit power level based on the received power information corresponding to the ongoing wireless communication in the another service set;
determining the signal preamble detection threshold following the guiding information and based on the determined transmit power level; and
controlling a transceiver in the device based on the determined signal preamble detection threshold and the determined transmit power level to control the transmission concurrently with the ongoing wireless communication in the another service set,
wherein the signal preamble detection threshold is used to discard received signals from at least one service set that is different from the present service set and with a strength below the signal preamble detection threshold.

14. The non-transitory computer readable medium of claim 13, wherein the operations further comprise:
determining a relationship between the signal preamble detection threshold and the transmit power level based on the guiding information; and
determining the signal preamble detection threshold based on the determined relationship and the determined transmit power level.

15. The non-transitory computer readable medium of claim 14, wherein the guiding information includes a minimum value for the signal preamble detection threshold, a maximum value for the signal preamble detection threshold, and the reference value for the transmit power level.

16. The non-transitory computer readable medium of claim 15, wherein the operations further comprise:
determining the relationship as a proportional relationship based on the maximum value, the minimum value, and the reference value.

* * * * *